(12) United States Patent
Brewington (10) Patent No.: US 7,197,644 B2
(45) Date of Patent: Mar. 27, 2007

(54) SYSTEMS AND METHODS FOR PROVIDING HARDCOPY SECURE DOCUMENTS AND FOR VALIDATION OF SUCH DOCUMENTS

(75) Inventor: Grace T. Brewington, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 818 days.

(21) Appl. No.: 10/320,864

(22) Filed: Dec. 16, 2002

(65) Prior Publication Data

US 2004/0117627 A1    Jun. 17, 2004

(51) Int. Cl.
*H04L 9/00* (2006.01)
*H04N 1/44* (2006.01)

(52) U.S. Cl. .................. 713/176; 713/181; 380/243

(58) Field of Classification Search ............. 713/176; 380/243
See application file for complete search history.

(56) References Cited

U.S. PATENT DOCUMENTS

| 5,291,243 | A | | 3/1994 | Heckman et al. | 355/201 |
|---|---|---|---|---|---|
| 5,388,158 | A | * | 2/1995 | Berson | 713/176 |
| 5,444,779 | A | | 8/1995 | Daniele | 380/3 |
| 5,486,686 | A | * | 1/1996 | Zdybel et al. | 235/375 |
| 5,489,158 | A | | 2/1996 | Wang et al. | 400/103 |
| 5,742,685 | A | | 4/1998 | Berson et al. | 380/25 |
| 5,841,886 | A | | 11/1998 | Rhodes | 382/115 |
| 5,901,224 | A | | 5/1999 | Hecht | 380/4 |
| 5,982,956 | A | | 11/1999 | Lahmi | 382/306 |
| 6,161,183 | A | | 12/2000 | Saito et al. | 713/176 |
| 6,175,714 | B1 | | 1/2001 | Crean | 399/366 |
| 6,209,090 | B1 | * | 3/2001 | Aisenberg et al. | 713/178 |
| 6,328,209 | B1 | | 12/2001 | O'Boyle | 235/380 |
| 6,378,070 | B1 | * | 4/2002 | Chan et al. | 713/155 |
| 6,457,651 | B2 | | 10/2002 | Paul | 235/494 |
| 6,487,301 | B1 | * | 11/2002 | Zhao | 382/100 |

FOREIGN PATENT DOCUMENTS

EP    1 209 897 A2    5/2002

OTHER PUBLICATIONS

European Search Report.

* cited by examiner

*Primary Examiner*—Kambiz Zand
*Assistant Examiner*—Christopher J. Brown
(74) *Attorney, Agent, or Firm*—Mark Z. Dudley (57) ABSTRACT

A secure document processing system for receiving an original document and for printing a secure hardcopy version of the original document, wherein the secure hardcopy version includes a machine-readable encoded image signature which represents an image segment of the original document. Such hardcopy secure documents can be validated by inputting them to an secure document validation system operable to identify and process the machine readable encoded representation and in response to determine whether the recovered image signature indicates that the document is counterfeit or has been altered.

21 Claims, 7 Drawing Sheets

SYSTEMS AND METHODS FOR PROVIDING HARDCOPY SECURE DOCUMENTS AND FOR VALIDATION OF SUCH DOCUMENTS

The present invention relates to the controlled production of a secure document on a printing or reprographic device and in particular is directed to systems and methods for providing hardcopy secure documents having integrated therein one or more encoded image signatures, and for validation of such documents.

Documents are a primary medium for written communications and for record keeping. Paper documents can be replicated easily by photocopying, distributed and filed in original, electronic, or photocopied form, and facsimiles of them can be transmitted to remote locations. Paper and other hardcopy documents are so pervasive that they are not only a common output product of electronic document processing systems, but also an important source of input data for such systems.

A variety of methods are known in the art for attempting to hinder and/or help detect forgery, alteration, or duplication of sensitive documents such as negotiable instruments, and especially for checks and bank drafts.

Various methods have been attempted for specially preparing the paper or substrate on which sensitive information is printed. For example, checks and banking documents are typically printed on special paper which, when copied, alter their appearance to destroy information contained thereon or to indicate that the document at hand is a copy. Other attempts to create copy-proof documents use special paper with fluorescent dyes or paper written upon in colored ink.

Authenticity is an important issue for official documents, such as identification cards or passports. In the example of a protected identification card, an identification number may be written in clear text on the card and hidden as a watermark in the identity photo. A counterfeit, made by replacing the photo, is detected by scanning the card and determining that the number hidden in the photo does not match the number printed on the card.

Other concerns include the verification of the content of the document, that is, to detect alterations and modifications in an image, and for limiting user access to the information content carried on the document.

Other examples of documents for which resistance to forgery, copying, or other tampering is desired include: stock or bond certificates, driver's licenses, identification cards or papers, passports, betting slips, prize or game awards, tickets, or documents that simply require validating signatures to be affixed thereto, such as electronically negotiated and/or transmitted contracts, etc.

Thus, it would be highly advantageous for sensitive documents such as negotiable instruments and the like to be generated on demand without requiring special paper supplies of pre-printed safety background paper. It would also be desirable to have a versatile system that digitally generates and integrates encoded image signatures in negotiable instruments with the encoded information appearing on the secure document, for integral printing.

Accordingly, a need exists for a system and method to control the alteration, reproduction, and counterfeiting of sensitive documents that is based on both a practical method for production of a hardcopy secure document and on a simplified method by which such a hardcopy secure document may be validated when necessary.

Disclosed is a system for producing tamper-resistant hardcopy secure documents. The disclosed system can digitally form and integrate, into one hardcopy secure document, the human readable information content of the original or source document, plus an encoded, machine-readable, image signature. This composite image can be printed on demand, in a single pass of the paper or other substrate, preferably in an appropriate electronic printer as described herein, so as to eliminate the problems and dangers of conventional security document printing systems requiring pre-printed "safety paper".

The present invention accordingly provides methods for producing a hardcopy secure document which minimize or preclude the ability to alter or reproduce the hardcopy secure document without detection of such, such as by unauthorized methods which may include copying or electronically scanning, altering, and then printing the altered version of the hardcopy secure document.

Specifically, the present invention provides a printing system including a controlled access electronic printing machine, wherein secure hardcopy documents may be printed with the controlled access electronic printing machine, and the secure documents have printed-images formed therein that include at least one encoded image signature. The resulting hardcopy secure documents having both the original document image and the encoded image signature printed thereon cannot be easily altered or reproduced without being detected as having been altered or reproduced.

For example, the encoding of the image signature may be provided as digital data recorded by writing two dimensional marks on a recording medium in accordance with a pattern, which encodes data representative of the image signature.

In accordance with an embodiment of the present invention, a document processing system may be implemented for receiving an original document and for printing a secure hardcopy version of the original document, wherein the secure hardcopy version includes a machine readable encoded representation of a segment of the original document. The integration of machine readable encoded representation of a segment of the original document with the human readable hardcopy renderings of the original document may be advantageously employed, for example, when such secure documents are validated by scanning such hardcopies into electronic document processing systems. Embodiments of the present invention offer a mechanism for enabling recipients of scanned-in versions of such secure hardcopy documents to identify and process the machine readable encoded data and for alerting the recipients of the scanned-in documents to information indicating that the document is counterfeit or that alteration(s) have been made to the document.

In accordance with another embodiment of the present invention, a hardcopy secure document validation system may be implemented to receive a secure document having therein previously embedded data representing an image signature. The secure document may be scanned in a validation process to provide a document image, whereby data representing the image segment carried in the encoded image signature (considered herein as the primary image signature) is recovered from the document image. The image segment of the hardcopy secure document is again scanned and subjected to processing according to an image signature template to provide data representing a secondary image signature. The data representative of the primary and secondary image signatures is compared and the apparatus determines whether the comparison indicates a match, and accordingly validates the secure document, or a discrepancy, and accordingly indicates that the secure document is counterfeit or has been altered.

In addition to encoding the data representing one or more image segments of the original document, this invention may be utilized for encoding information concerning the image signature template used to capture the image segment(s) of the original document. Information concerning the level of corroboration of primary and secondary image signatures required for validation of the document may also be encoded in the encoded image signature. Additional information may be encoded and for computational purposes, such as for enhancing error-checking of the decoded image signature.

Provision may be made for encoding data specific to a single, given hardcopy secure document, which can include a dated or numbered version of that document, the identification of the machine which generated the document, and so on. Moreover, provision also may be made for encoding information about the encoding mechanism itself, such as information given in standard-encoded headers about subsequently compressed or encrypted digital information.

Furthermore, provision may be made for the encoding of specifications for image processing techniques and/or other image discrimination algorithms which are to be performed by the validation system when capturing and comparing primary and secondary image signatures, or of instructions which relate to operations which are to be performed by the validation system depending on the presence or absence of a valid/invalid condition; for example, instructions directing actions which are to be taken when a secure document is found to be counterfeit or to have been altered.

Provision may also be made for encrypting some or all of the information encoded in the image signature, such as for encrypting information describing the image signature template, for purposes of enhancing the security of the hardcopy secure document and for enhancing methods for the authentication and verification of document integrity.

When the original document includes a scanned-in original image, this invention may be utilized for integrating the scanned-in original image into the hardcopy version of the secure document. The encoded image signature in the hardcopy rendering of such a document will accordingly represent embedded data characterizing the input scanner and the scan process responsible for inputting the original image. Accordingly, when a counterfeit document is attempted by reproducing the secure document on a light-lens or electronic copier or a facsimile system, the recovered data representing the primary image signature (which will distinguish the authorized and unauthorized reproduction equipment and processes) can be compared to the secondary image signature segment captured from the counterfeit reproduction, and the counterfeit is then discovered.

As will be appreciated, the image signature may be encoded and embedded in the hardcopy secure document in a variety of ways. For example, it may be distributed in a background portion of the document to ensure the inclusion and robust survival of this important information. Some or all of the encoded image signature may be redundantly recorded on differing portions of the hardcopy renderings to increase it's likelihood of surviving abrasion, mutilation or other handling problems.

Therefore, in accordance with the present invention, an apparatus and method is provided for producing a secure document having embedded machine readable data, wherein the apparatus scans an original document to provide a digitized bit map, which is then processed according to an image signature template to select and obtain data representing a primary image signature. The primary image signature data is encoded to provide a field of embedded machine readable data. The apparatus may also optionally encode information indicating the image signature template which is to be used for recovery of the primary image segment, and inserts the encoded machine-readable data into the digitized document at an appropriate location reserved or otherwise suitable for insertion of the embedded data, such as by the use of glyph codes in the background of the digitized document. Thereafter, a hardcopy version of the digitized document is produced, including the newly-added embedded machine readable data, such that the hardcopy secure document is substantially visually identical to the source document, that is, visually identical with the exception of the added machine-readable data field which may or may not be distinguishable to the naked eye.

In accordance with another aspect of the present invention, the validation apparatus includes a code detector having access to a digital representation of an inputted hardcopy secure document. The code detector detects the presence of machine readable code embedded, for example, in the background of the document. A code decoder is also provided operatively connected to the code detector which decodes the previously detected machine readable code into recovered data representing the primary image signature and information representing the image signature template previously associated with the document. A controller receives the image signature template and the recovered data and, based on further processing of the digital representation of the document, derives a secondary image signature according to the same image signature template, and compares the data representing the primary and secondary image signatures so as to allow or disallow acceptance of the hardcopy secure document. The digital representation can obtained from image capture devices, a facsimile-type or other image data transmission, and/or stored digitized data representing the document following scanning or data transmission operations.

In accordance with another aspect of the present invention, the digital image validation apparatus also includes a storage device, memory, or the like for storing data, optionally including various authorized decoding schemes, image signature templates, and signature comparison criteria selectable for distinguishing the primary and secondary image, and optionally including stored data representing image signatures known to be either valid or invalid.

In accordance with another aspect of the present invention, a processor is also provided in communication with the controller. In certain circumstances, the processor receives the decoded image signature so as to perform further processing such as image translation or character recognition in order to obtain additional data including document or personal identity information.

In accordance with another aspect of the present invention, identification data indicative of the original document and/or the proffered hardcopy secure document is transmitted to ancillary systems for various reasons including the indication of an attempt to validate an invalid document. This identity information may be passed to security or document tracking system for advantageous use, such as for display of the recovered information as human readable information to an operator at a monitoring station.

In accordance with another aspect of the present invention, the validation apparatus may be automated. Such automation may include performing conditional responses, such as impounding the scanned-in hardcopy secure document if it is determined to be invalid.

In accordance with another aspect of the present invention, the validation apparatus is in operative communication with an user interface, and provides indications of document information content, validity, invalidity, and other information to an operator.

In accordance with another aspect of the present invention, the machine readable code format includes at least one selected from the list of glyph coding, bar code, and/or microdot codes.

In accordance with another aspect of the present invention, a method is provided for making a tamper-resistant personal identification card, and especially for a personal identification card including a photograph.

In accordance with another aspect of the present invention, the image signature template may be arranged to capture at least a portion of a photograph (or similar image), document watermark, personal signature, fingerprint, retinal scan, or other information captured by use of the image signature template.

One advantage of the present invention resides in the great difficulty in counterfeiting (or otherwise providing an unauthorized reproduction) of a secure document when such a document incorporates the above-described features, such as the encoded image signature.

Another advantage of the present invention resides in the use of a machine readable code, such as a glyph pattern, that is distributed over at least a portion of the secure document in order to prevent the machine-readable code from being inadvertently or intentionally defeated or degraded.

The invention may take form in various components and arrangements of components, and in various steps and arrangements of steps. The drawings are only for purposes of illustrating the preferred embodiments and are not to be construed as limiting the invention.

Plain paper is a favored recording medium for storing and transferring human readable information. The emergence of electronic document processing systems show that the functional utility of plain paper and other types of hardcopy documents may be enhanced significantly when the human readable information they normally convey is supplemented by writing appropriate machine readable digital data on them. This machine readable data enables a hardcopy document to actively interact with such a document processing system when the document is scanned into the system by an ordinary input scanner.

Modern electronic document processing systems generally include input scanners for electronically capturing the general appearance (i.e., the human readable information content and the basic graphical layout) of human readable hardcopy documents; programmed computers for enabling users to create, edit and otherwise manipulate electronic documents; and printers for producing hardcopy, human readable renderings of electronic documents. These systems typically have convenient access to mass memory for the storage and retrieval of electronic document files. Moreover, they often are networked by local area networks (LANs), switched data links, and the like for facilitating the interchange of digital electronic documents and for providing multi-user access to shared system resources, such as high speed electronic printers and electronic file servers.

Accordingly, an original document which may contain sensitive information therein can be produced or reproduced according to the invention in hardcopy form from a designated, controlled-access electronic printing machine or machines. Such machines contain and utilize apparatus for integrating machine-readable code into the secure document according to the invention in order to provide a secure, hardcopy version of the original document.

Documents bearing sensitive information, or which may be associated with sensitive information or a particular status, are described to include, but are not limited to, context sensitive documents, personal and performance history documents, financial documents, negotiable instruments, strategic or developmental plan documents, checks, tickets, and the like proprietary documents. Other sensitive documents include, for example, government, intelligence, security, financial, classified or registered, organizational, and the like hard copy documentation. The secure printing method of the present invention can be used to produce secure documents and other documentary articles of commerce. Documents for which security may be desired include, for example, bank notes, currency, stock certificates, bonds, visas, passports, stamps, driver's licenses, permits, tickets, credit cards, cash withdrawal cards, check cards, phone cards, access cards, travelers checks, bank checks, remote access control cards, and the like instruments. It will be appreciated that the term "document" as used herein in reference to the inclusion of bar codes and glyphs thereon is not limited to conventional sheets of paper or plastic. In this application it also broadly encompasses packaging, labels, cards and cardkeys, tokens, and various other printable image substrates.

The hardcopy secure document production systems of the present invention, in embodiments, therefore preferably operate under controlled access, i.e. printing privileges may be restricted to only authorized individuals. Authorized individuals are, for example, those persons with authority or permission to create and generate hardcopy versions of documents of a protected nature and which documents are intended to usually permit no further reproduction and may include limited or restricted distribution.

Original documents can also be of a confidential nature and it is often desired to limit readership, replication, and dissemination of such information.

Images, of either original or reproduced documents or components thereof, refers to, for example, alphanumeric characters, line art, bit maps, pictorial images, graphic images, watermark images, and the like images, and combinations thereof.

Reprographic devices include devices which provide for the hardcopy reproduction or replication of documents, whether the documents are in paper, other hardcopy, or electronic form prior to the reproduction, including photocopiers, electronic printers, digital copiers, and the like, being used to reproduce all types of documents. The reprographic and replication devices useful in the present invention include, for example, digital copiers, copying printers, digital scanning-printing devices, digital input scanners with remote printing means, and like devices. Printing machines operable in such embodiments may employ a marking engine, for example, employing a dry, liquid, or combination thereof of marking materials, and corresponding development system, for forming hardcopy images.

Describing now in further detail the exemplary embodiment with reference to the Figures, it will be understood that the exemplary hardcopy secure document production and validation systems are typically operable by a workstation connected to one or more storage devices, scanner, or printer, all of which can be stand-alone units, or connected for communication over a network with each other and/or other elements such as a remote auxiliary storage device (not shown). The illustrated hardcopy secure document production system may be operated to digitally form and integrate various components of an original document in an automated manner, and the illustrated hardcopy secure document validation system may be operated to validate the resulting secure document in an automated manner as well.

Figure 1:
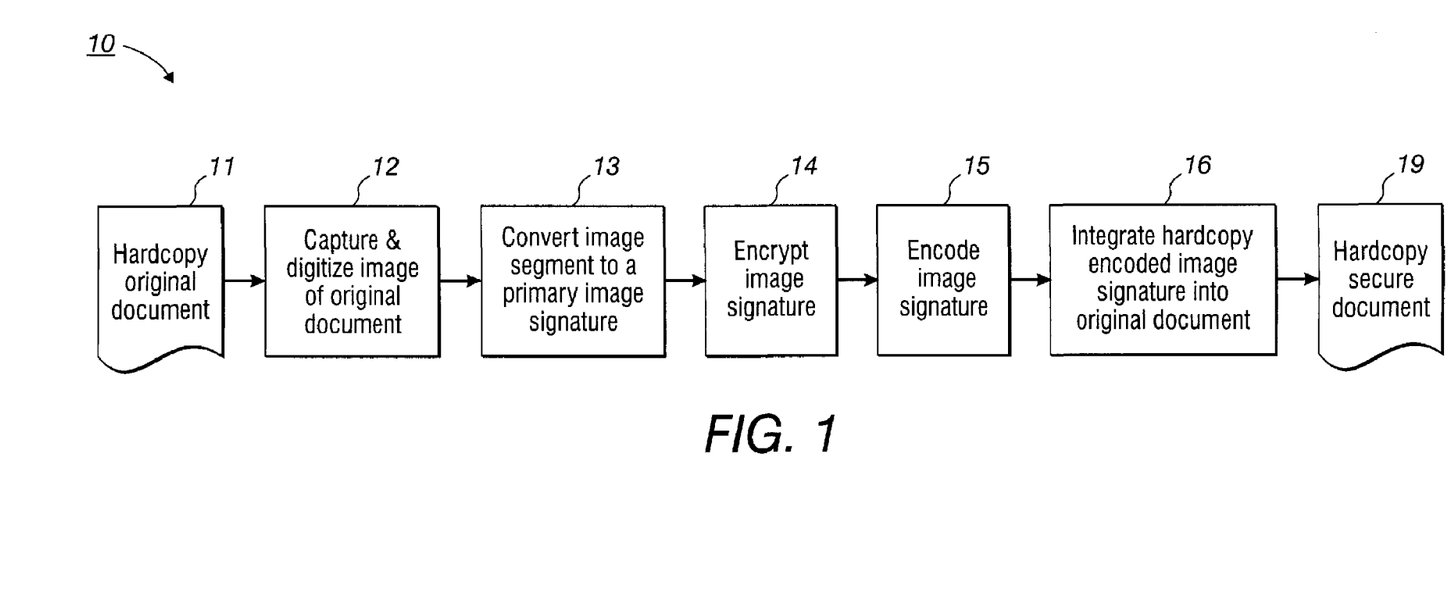
FIG. 1 illustrates a method incorporating steps for providing a hardcopy secure document from a hardcopy original document.

FIG. 1 illustrates a method 10 incorporating steps for providing a hardcopy secure document 19 from a hardcopy original document 11. The hardcopy original document 11 is provided in step 12 to an image capture apparatus for capturing and digitization of an image of the original document 11. In typical applications, the captured image is digitized to provide an array RGB pixel values in a digitized image file. In step 13, a segment of the captured image is selected according to a predefined image signature template and the selected image segment is converted to a primary image signature. Such conversion can include subsampling of the selected image segment so as to perform spatial averaging and to reduce the amount of image data. In step 14, the image signature is optionally encrypted according to a known encryption scheme, and in step 15 the image signature is encoded in machine-readable code. In step 16, the encoded image signature is generated in hardcopy form and the resulting hardcopy encoded image signature is integrated in the original document 11. Such integration may be performed by printing the hardcopy encoded image signature on the original document 11 or by printing the hardcopy encoded image signature on a substrate which is then affixed to the original document 11 so as to provide a hardcopy secure document 19.

Figure 2:
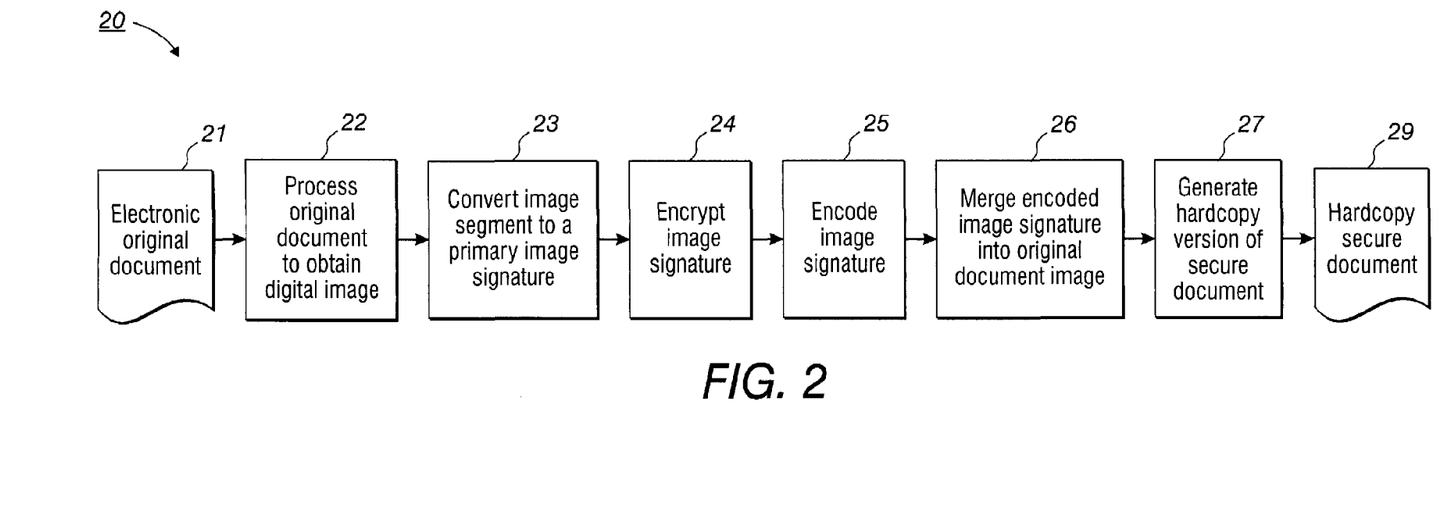
FIG. 2 illustrates a method incorporating steps for providing a hardcopy secure document from an electronic original document.

FIG. 2 illustrates a method 20 incorporating steps for providing a hardcopy secure document 29 from an electronic original document 21. In typical applications, the electronic original document is in digital form as an array RGB pixel values in a digitized image file. The electronic version 21 of the original document is provided in step 22 to an image processing apparatus for selection of an image segment thereof according to a predefined image signature template. In step 23, the selected image segment is converted to a primary image signature. In step 24, the image signature is optionally encrypted according to a known encryption scheme, and in step 25 the image signature is encoded in machine-readable code. In step 26, the resulting encoded image signature is merged with the electronic version 21 of the original document to provide an electronic version of the resulting secure document. In step 27, the electronic version of the secure document is provided to reprographic apparatus for generation of a hardcopy version of the secure document in hardcopy form, so as to provide a hardcopy secure document 29.

Figure 3:
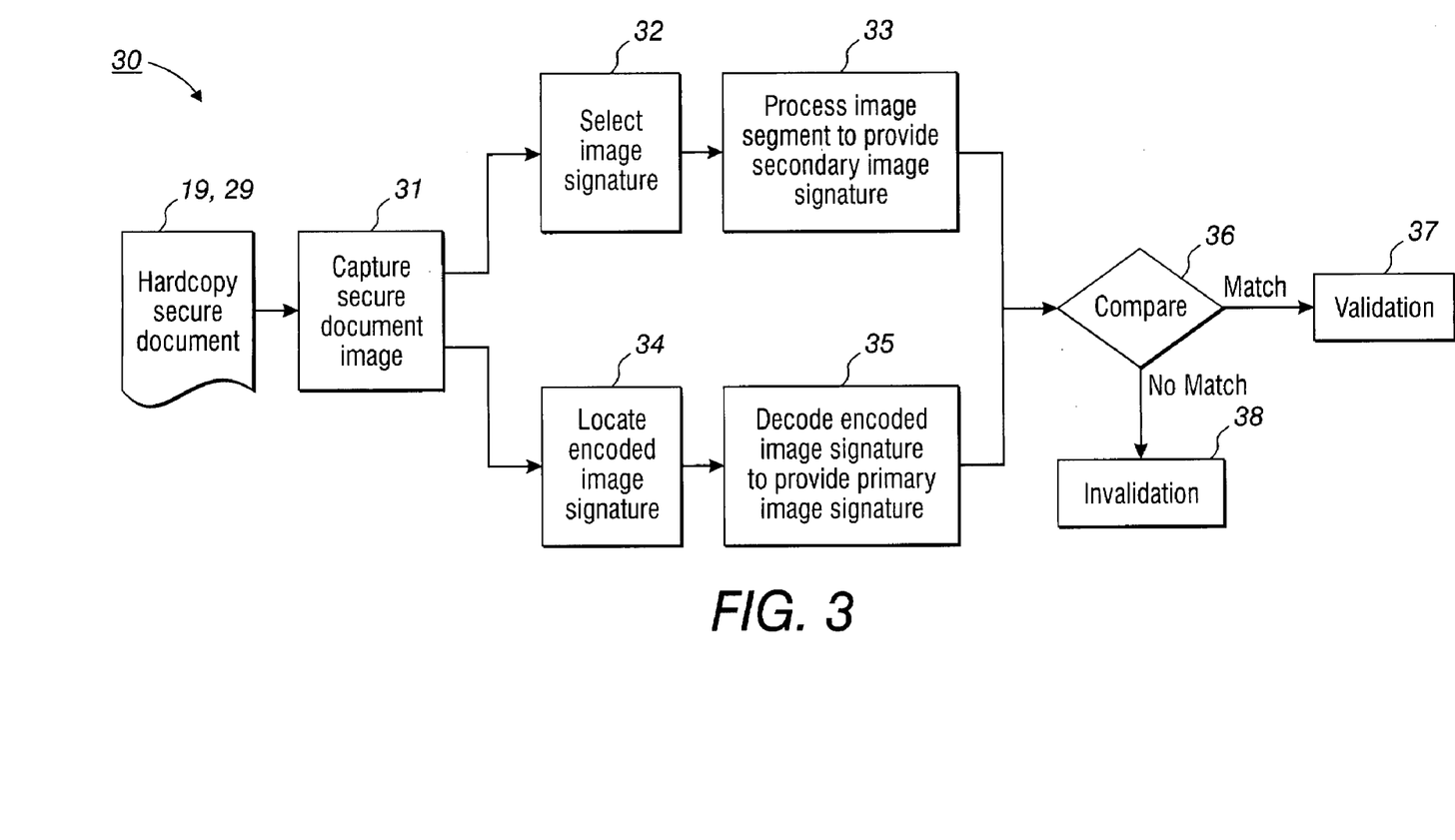
FIG. 3 illustrates a method incorporating steps for validating a hardcopy secure document.

FIG. 3 illustrates a method 30 incorporating steps for validating the hardcopy secure documents 19, 29 generated in the methods illustrated in FIGS. 1 and 2. In step 31, at least one of the hardcopy secure documents 19, 29 is provided to an image capture apparatus for capturing and digitization of an image of the hardcopy secure document so as to provide a digitized image. In step 32, an image segment of the digitized image is selected according to the predefined image signature template used in the methods 10, 20 and the selected image segment processed so as to provide, in step 33, data representative of a secondary image signature. In step 34, the encoded image signature presented in the hardcopy secure document is located. In step 35, the encoded image signature decoded so as to recover data representative of the primary image signature. In step 36, the data representative of the primary and secondary image signatures are compared. A resulting determination of data matching will result in a validation condition 37 or a determination that the data has not matched will result in an invalidation condition 38.

Figure 4:
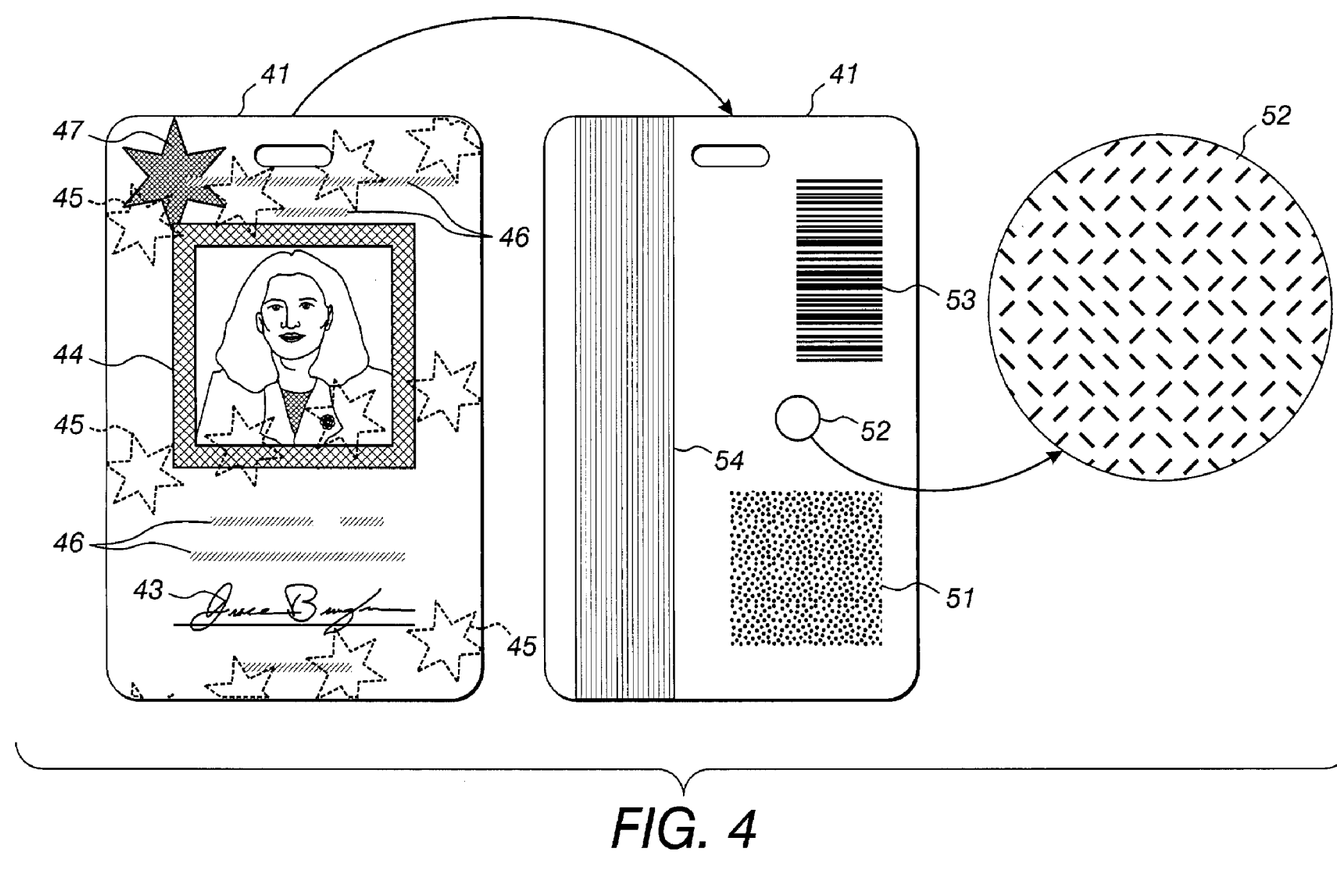
FIG. 4 is an exemplary illustration of a secure document provided in the form of a personal identification card, containing an image signature recorded as machine readable code in accordance with the present invention. The illustration shows various exemplary elements of that particular document, portions of which may be selected for encoding in the image signature.

FIG. 4 illustrates a first example of secure document constructed in the form of an identification card 41 applicable for validation in a card security system according to one embodiment of the present invention. The illustrated identification card 41 includes a front surface of the card substrate on which is recorded a conventional watermark or hologram image 45, a personal signature 43, a photograph or other personalized image 44, a specialized graphic such as a corporate logo 47, and text 46. On the rear surface of the card substrate there may be recorded for conventional purposes, a low-density barcode 53. The illustrated barcode 53 is a type of one-dimensional barcode. According to the present invention, the identification card 41 has integrated therein an encoded image signature recorded in machine readable form, which, for example, may be embodied in a high-density (e.g., two-dimensional) barcode 51, a background machine-readable pattern 52, or a magnetic stripe 54.

Figure 5:
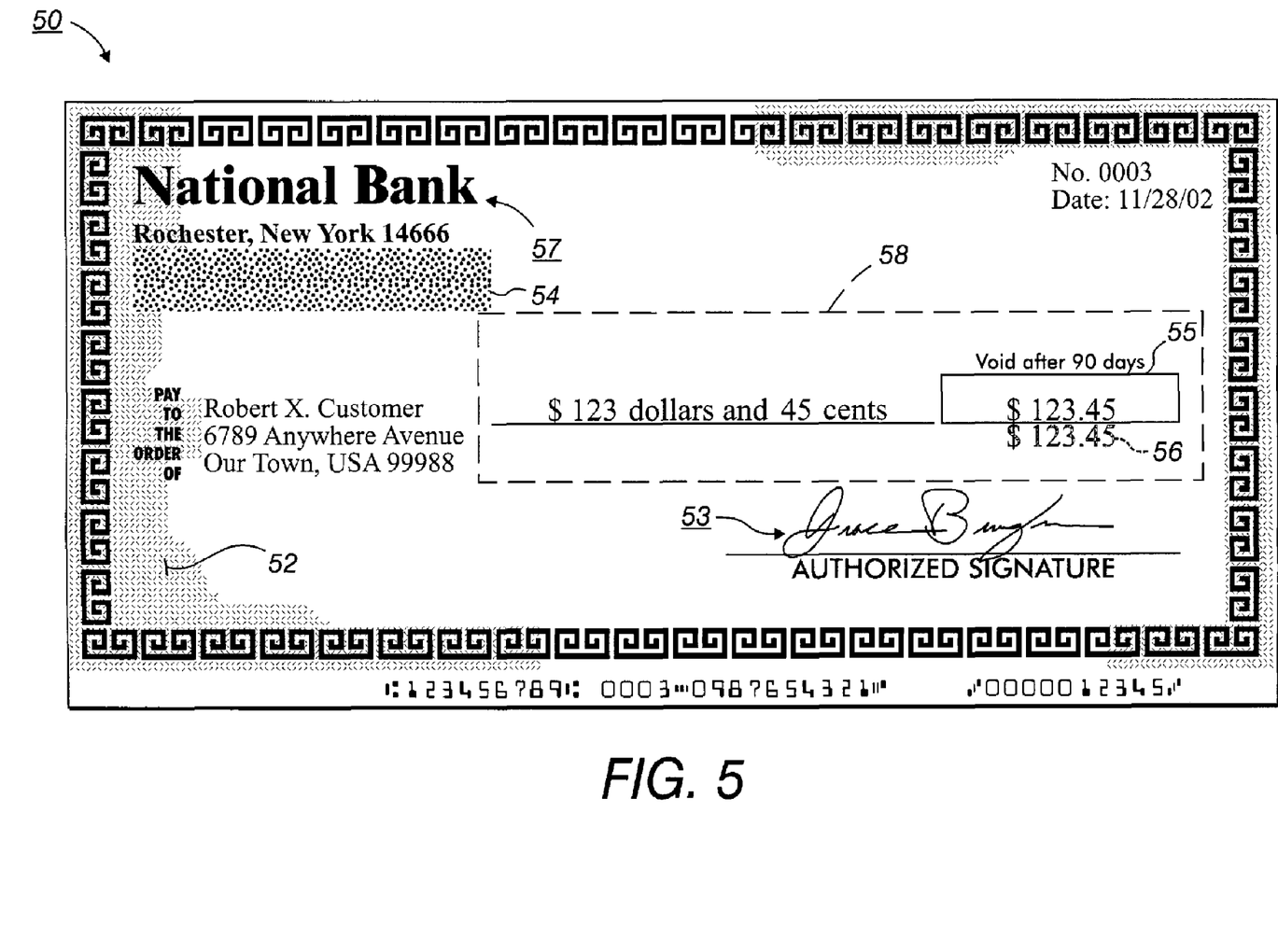
FIG. 5 is an exemplary illustration of a hardcopy secure document provided in the form of a bank check.

FIG. 5 illustrates a second example of a secure document, provided in the form of a negotiable instrument. This example is a bank check 50 which includes a background machine-readable pattern 52, a high-density barcode 54, graphics such as box 55, text such as check name 57, a validating signature 53, and a secure font 56. One example of an image segment suitably captured for creation of a useful image signature is illustrated by an image signature template boundary 58. According to a feature of the present invention, the illustrated negotiable instrument, with its encoded image signature recorded in the a background machine-readable pattern 52 or barcode 54, either of which has suitably recorded therein certain unique information for that particular document, may be automatically printed at one time, in one printing pass of the paper or other substrate, without any human interaction, and without requiring pre-printed safety paper and/or pre-printed forms.

FIGS. 4 and 5 illustrated but two examples of a hardcopy secure document constructed in according to respective embodiments of the present invention. As will be appreciated by those skilled in the art, the identification card 41 or the bank check 50 can incorporate more or less than the illustrated combination of features, and such features may be provided at differing locations on the front and rear surfaces of their substrates, as needed. It is noted that in FIGS. 4 and 5, the encoded image signatures are located in predetermined areas of the hardcopy secure document.

Figure 6:
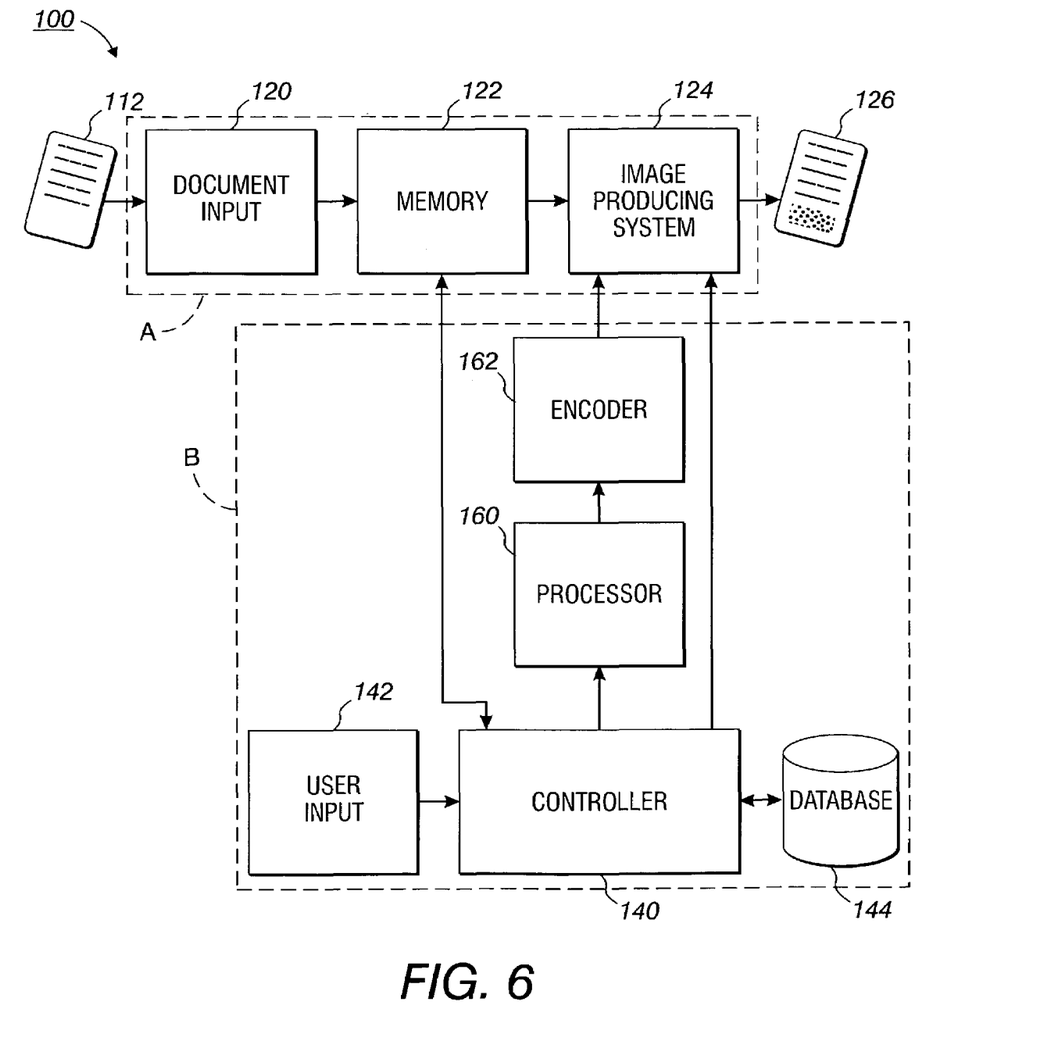
FIGS. 6 and 7 are diagrammatic illustrations of systems for respectively generating and validating a hardcopy secure document, constructed in accordance with the present invention.

FIG. 6 illustrates a secure document production system 100 that includes components A for original document acquisition, data storage, and subsequent production of a hardcopy secure document. The components B are operable to control the production of such specially-encoded secure documents, as will be discussed more fully below.

Components A include a document input 120 which receives an original document 112 (and digitizes the original document if not already in digital form) and provides data representative of the digitized image for storage in memory 122. It is appreciated by those skilled in the art that the original document 112 may be either a hardcopy original document, a digital image file outputted from a similar document input device (not shown), or a data stream representing the image of an original document which is presented in a form compliant with a suitable image data format.

Controller 140 receives the original document image data from memory 122 and processes the original document image data according to automated image processing algorithms that are optionally supplemented by instructions from a user input 142. Preferably, the controller 140 operates according to one or more predefined image signature templates, image signature encoding and/or encryption schemes, user authorization codes, and other operations and protocols selectable from a database 144. The controller 140 controls the image producing system 124, a processor 160, and an encoder 162, which convert the image signature into appropriate machine readable code to be placed in, for example, the background of the original document image in order to produce a hardcopy secure document 126.

Additionally, controller 140 may interface with the database 144 to record a variety of information relevant to the production of the hardcopy secure document 126. For example, an organization may desire that records of some or all hardcopy secure documents and their respective image signatures, templates, encoding schemes, etc. be retained by the system 100.

Figure 7:
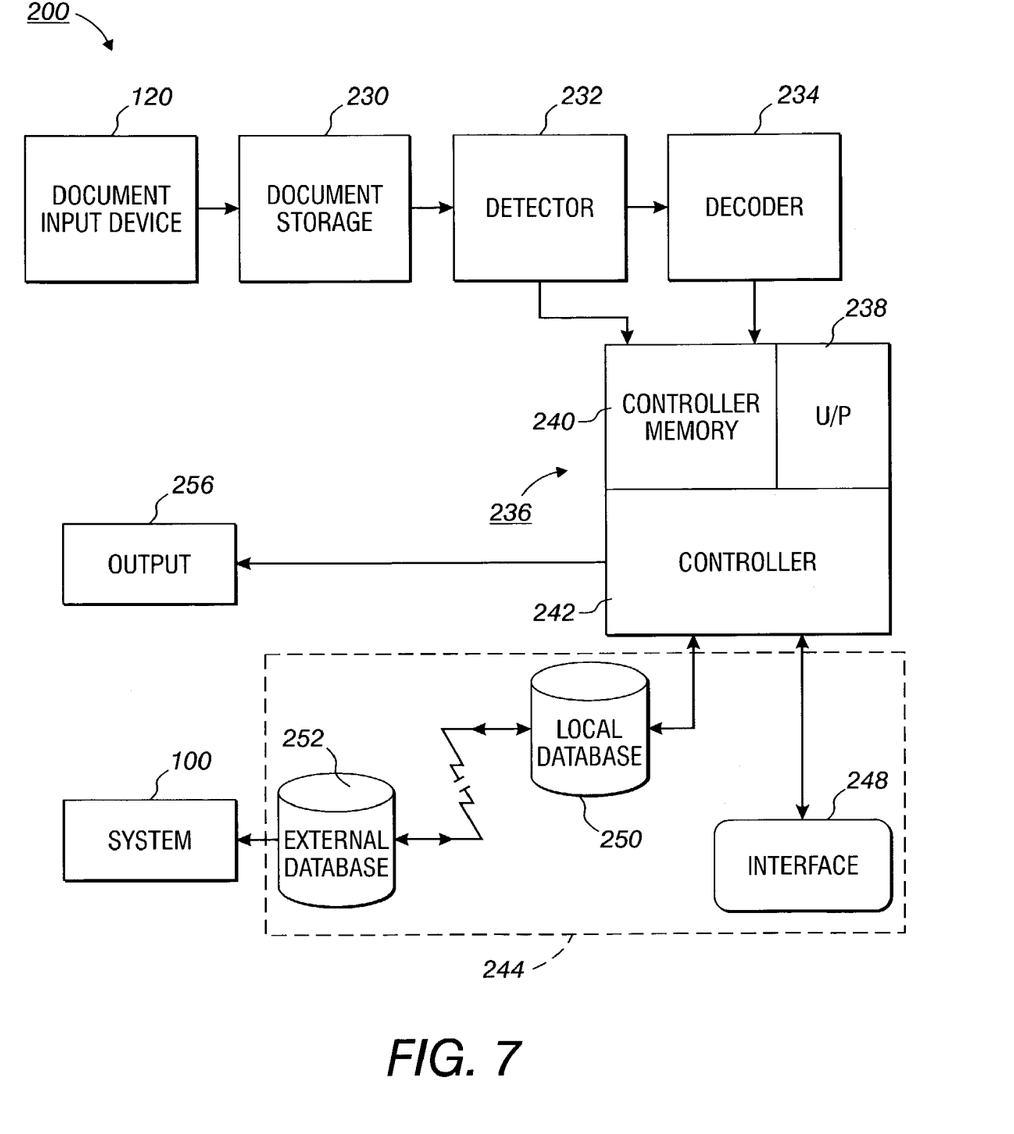

FIG. 7 shows an architecture of a secure document validation system 200 constructed according to the subject invention. With attention to the validation method already described with respect to FIG. 3, the depicted apparatus may be understood as follows. Generally, the illustrated apparatus is intended to work with any document input device suitable for capturing a digitized representation of a hardcopy secure document provided according to the teachings herein.

A document input device 120 includes a digital image capture device (e.g., a card scanner, flatbed image scanner, or similar device). A hardcopy secure document is scanned so as to capture and image of the secure document in a digitized form, which may be stored as a bit map in document storage 230. Detector 232 is employed to determine if the digitized document image contains image signature data embedded in machine-readable form. Detector 232 analyzes a segment of the scanned bit map image in accordance with the predefined image signature template. During this analysis, detector 232 locates the embedded data presented in an encoded image signature. In the case of glyphs, this may involve analyzing the gray level, and texture and the segmentation and recognition of glyph patterns. For simplicity in the following description, the embedded image signature data will be assumed to have been recorded in the form of glyph codes.

The encoded image signature detected by detector 232 is decoded by decoder 234 in accordance with known techniques including those teachings found in the patents and applications cited and incorporated herein. This information is passed to a control system 236 which includes a microprocessor 238, a controller memory 240, and a controller 242. Data storage and transfer system 244 provide data to and from controller 236. The system 244 may include one or more devices including a user interface 248, a local database 250, or an external database 252 optionally connected to the hardcopy secure document production system 100 and to a communication channel with local database 250.

Control system 236 reads the decoded glyph codes from decoder 234 so as to provide data representative of the primary image signature. The control system 236 also applies the image signature template to the bit map obtained from document storage 230 so as to generate data representative of a secondary image signature. Data representing the primary image signature and the secondary image signature are compared in accordance with instructions stored in control system 236, via data received through data input 244, or from data stored in controller memory 240. The results of this processing, and (optionally) information relevant to the data recovered from the image signature, are transmitted to interface 248 and/or output device 256. Instructions operable in control system 236 in response to a determination of validity or invalidity conditions may be used for specialized operation of the interface 248 and/or output device 256. Such conditions can trigger instructions to indicate, in human readable form, information such as visual representations of the primary and/or secondary image signature data, as well as an indication of the image signature validity, invalidity, or some intermediate condition such as a relative level of validity. Such information is suitably available for display upon, or actuation of, a conventional display means (not shown) for the benefit of an operator, or this information is available for carrying out one or more automated procedures relevant to the condition declared by the control system 236, such as for impounding a hardcopy secure document declared as "invalid" in the document input device 220; or, in accordance with known techniques, including those teachings found in the patents cited and incorporated herein, for storing the bit map at the appropriate location in document storage 230.

Alternatively, the bit map data stored in document storage 230 may be maintained in electronic form and placed on a network through local database 250 which is in communication with external database 252 that may be part of a communication system having a remote security device (not shown). Using known technologies, data may be sent to the communication system for a variety of purposes, such as for archival storage of the bit map data, for use in the operation of the secure document production system 100, or for sounding an alert concerning an invalidity or fault condition, when appropriate.

In an embodiment where the scanned-in document stored in document storage 230 is determined by detector 232 to contain no encoded information, decoder 234 accordingly provides data to control system 236. According to the particular implementation of the invention as may be desired, the hardcopy secure document may be declared invalid, as previously discussed, or defective, or another indication relevant to this condition may be declared.

It is to be appreciated that, although the user input 142 and the user interface 248 are illustrated and described in the embodiments, the above-described operations may be accomplished in certain embodiments in an automatic manner, without requiring the interaction of a user. In perhaps one of the simplest modes of operation contemplated for this invention, the validation system 200 may be operated in such a way that the hardcopy secure document may be received by the document input device 220 and almost instantaneously is determined to be valid or invalid.

Furthermore, the contemplated image signature template is preferably oriented to capture an appropriate portion of the information content that is unique to the original document, such as a segment that includes one or more portions of a pictorial image, personal signature, watermark or logo, etc. It is to be appreciated that more than one image signature templates may be employed in the above embodiments, and that the image signature template may exhibit one of a variety of geometric and non-geometric configurations, such as a rectilinear stripe, a curved stripe, a checkerboard pattern, and the like. Furthermore, the comparison of primary and secondary image signatures may include techniques known in the art for discriminating useful data from noise, and for accommodating the absence of recovered data due to, for example, dirt, fading, or minor abrasion of the hardcopy secure document.

In the above description, two-dimensional barcode and glyph technology or combinations thereof are indicated. The encoded image signatures may be preferably printed on a hardcopy secure document in an unobtrusive manner using multi-bit binary data symbols encoded in a two-dimensional code such as the self-clocking glyph code. With reference again to FIG. 4, the identification card 41 exemplifies a background pattern 52 of machine readable code configured as glyphs.

Kinds of data and methods for recording data discussed in the foregoing embodiments are only for explanation and not limited to the said embodiments. For example, an encoded image signature for the identification card may be stored in a hologram area in the form of hologram image, or written on the magnetic stripe 54, or recorded in the optically readable areas such as the indicated high-density barcode 51. Assorted exemplary encoding schemes include two-dimensional barcodes, commercially known as: PDF 417 (Symbol Technologies), Paper Data Barcoding (NeoMedia Technologies); DataMatrix (International Data Matrix, Inc.), 1.5 Dimension Symbology (Haisheng Liang); and glyph encoding such as DataGlyphs (Xerox Corporation). Further arrangements, such as integrating an integrated circuit memory in the hardcopy secure document substrate so as to enable storage of encoded image signature data, may also be useful for the present system. The proportion of the machine readable portions and human readable portions is not necessarily limited, and they may be of differing size, shape, content, or quantity than are indicated in the illustrations.

The coding and decoding of glyphs is well-known in the art and is described, for example, in commonly-assigned U.S. Pat. No. 5,444,779. The use of glyph technology to lay down a low-density background tint across the rear side of the substrate is a preferred implementation because it does not alter the legibility of the document, and will be reproduced in any authorized or unauthorized duplication. Moreover, a glyph background tint is not susceptible to intentional or inadvertent masking, thus ensuring the embedded code will be detected on equipped devices and reproduced on any reproducing apparatus. As an added measure or level of security, the low density background tint is observable on the original document. Thus, persons will be dissuaded from attempting to reproduce the document knowing it contains embedded security information. Alternatively, the validation system could be programmed to only accept hardcopy secure documents where the code is found in a specific place. Those skilled in the art will realize that other types of machine readable codes may alternately be embedded in the document for detection and analysis by components B, such as microdots, bar codes, and the like, without departing from the spirit and scope of the present invention.

A self-clocking glyph code typically is generated by mapping logically ordered digital input values of a predetermined bit length into a predefined set of graphically unique symbols (i.e., "glyphs"), each of which is pre-assigned to the encoding of a different one of the permissible input values. Thus, each of the input values is transformed into and encoded by a corresponding glyph. These glyph encodings, in turn, are written on a hardcopy recording medium in accordance with a predetermined spatial formatting rule, thereby producing a glyph code that encodes the input values and preserves their logical ordering. Another of the known advantages of these self-clocking glyph codes is that they can be composed of glyphs that are graphically distinguished from each other by machine detectable characteristics that are not easily perceived by the human eye. Thus, these codes can be used for recording machine readable digital information on hardcopy documents, without significantly degrading the aesthetic quality of those documents. For instance, the glyphs can be written using inks that are virtually invisible to the human eye under normal lighting conditions. Even more remarkably, glyphs written using visible inks, such as standard xerographic toners, can be of such small uniform size and written at a sufficiently high spatial density that the resulting glyph code has a generally uniform textured appearance to the human eye.

As will be appreciated, a code of the foregoing type carries the clock signal that is required for transferring the encoded digital values from the hardcopy domain to the electronic domain synchronously. Every input value is represented by a corresponding glyph, so the clock is embedded in the spatial distribution of the logically ordered glyphs. Broadly glyph-related patents include U.S. Pat. Nos. 4,728,984; 4,786,940; and 5,444,779 by J. Daniele. Other exemplary patents include U.S. Pat. Nos. 5,091,966, 5,128,525; 5,168,147; 4,716,438; 4,728,984; 4,757,348; 4,970,554, 5,060,980, 5,157,726, 5,221,833; 5,245,165; 5,278,400; 5,315,098; 5,317,646, 5,448,375, 5,449,895; 5,449,896, 5,453,605, 5,489,763, 5,521,372; 5,537,223; 5,572,010; 5,576,532; 5,611,575; 5,684,885; 5,706,099; 5,717,197; 5,761,686 and 5,771,245.

As noted, the particular high-density bar code patterns and the particular glyphs illustrated herein are merely exemplary, and others are known, including those noted in the references cited above, and/or including those in distinctive colors (which, of course, cannot be shown in patent drawings). In addition to the aforementioned glyph codes, other codes such as serpentine codes can be embedded into documents such that they are imperceptible to the unaided human eye. The illustrated two-dimensional bar code pattern is known to those skilled in the art.

Multi-color printing and scanning can be used to enhance the distinction and readability of the higher level of information density of the information encoded in the image signature. In addition, multi-color printing can be used to provide increased data density; for example, by using a very specific limited spectrum color for the glyphs in contrast to the typical black of the bar code pattern.

It is of course, desirable, and readily accomplished with the present invention, to print a composite of the original or source image and the encoded image signature in a single printing process by electronically superimposing the two or more images before electronic printing. As described above, this can be accomplished in a known manner by electronically merging the two or more images before they are printed.

It is also noted that the original document may be derived from more than one hardcopy document, or from more than one electronic document, or from a combination of hardcopy and electronic documents.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A hardcopy secure document production apparatus, comprising:
    an input that receives original document information;
    a memory for retaining the received original document information;
    a control system for processing the original document information, deriving an image signature based on an image segment of the original document according to an image signature template, and encoding data representing the image signature and the image signature template in machine readable form; and
    an image producing system for providing a secure hardcopy version of the original document information, wherein the secure hardcopy version has integrated therein the encoded data representing the image signature and the image signature template.

2. The apparatus of claim 1, wherein the image producing system is controlled by the control system to generate the encoded data representing the image signature on a substrate, whereby the substrate bearing the encoded image signature may be affixed to the original document so as to provide the secure hardcopy version.

3. The apparatus of claim 1, wherein the image producing system is controlled by the control system to print the encoded data representing the image signature on a substrate bearing the original document information so as to provide the secure hardcopy version.

4. The apparatus of claim 1, wherein the control system is operable to merge the encoded image signature with the original document information and provides a composite image to the image producing system for production of the hardcopy secure document.

5. The apparatus of claim 1, further comprising a user input in operative communication with the control system, which is operable according to user information received for permitting access to the hardcopy secure document production apparatus.

6. The apparatus of claim 1, wherein the control system is operable to encrypt the encoded image signature.

7. The apparatus of claim 1, wherein the control system is operable to encode the encoded image signature according to at least one of the following encoding schemes: two-dimensional bar coding, data glyph coding, holographic coding, and magnetic stripe formatted coding, and a combination thereof.

8. The apparatus of claim 1, wherein the control system is operable to provide in the encoded data an image signature template boundary used to capture the image segment of the original document.

9. The apparatus of claim 1, wherein the control system is operable to provide in the encoded data at least one of:
    information concerning the level of corroboration of the encoded image signature for validation of the secure hardcopy version; information specific to a given hardcopy secure document; information specifying image processing, image encryption, image compression, and/or image discrimination algorithms which are to be performed for validation of the secure hardcopy version; and information specifying operations which are to be performed by a validation system depending on the presence or absence of a valid/invalid condition.

10. A hardcopy secure document validation apparatus, comprising:
    document input device for receiving a hardcopy secure document having data representing an encoded image signature and an image signature template and for providing a document image derived from the received hardcopy secure document;
    a document storage device for retaining the document image;
    a detector for detecting and locating the data representing the encoded image signature in the document image;
    a decoder for recovering the data representing the image signature encoded in the encoded image signature, so as to provide a primary image signature; and
    a control system for processing the document image according to the image signature template to provide data representing a secondary image signature, and for comparing the data representing the primary and secondary image signatures to determine a corresponding validation or invalidation condition.

11. The apparatus of claim 10, wherein the control system is operable to determine whether the comparing of the data indicates a match, and accordingly validates the secure document, or a discrepancy, and accordingly indicates that the secure document is counterfeit or has been altered.

12. The apparatus of claim 10, wherein the document input device further comprises an input scanner.

13. The apparatus of claim 10, wherein the control system further comprises a data storage and transfer system adapted for handling data representing at least one of the primary and secondary image signatures.

14. The apparatus of claim 10, wherein the control system is operable to carry out instructions which relate to operations which are to be performed by the validation system depending on the determination of the validation or invalidation condition.

15. A method for providing a hardcopy secure document from an original document, comprising:
    capturing image of the original document;
    converting a segment of the captured image to an image signature according to a predefined image signature template;
    encoding data representing the image signature and the image signature template in machine-readable code;
    generating the machine-readable code; and
    integrating the resulting machine-readable code and the captured image in hardcopy form.

16. The method of claim 15, wherein the original document is provided in hardcopy form and the integrating step further comprises printing the hardcopy form of the machine-readable code on the original document so as to provide the hardcopy secure document.

17. The method of claim 15, wherein the original document is provided in hardcopy form and the integrating step further comprises printing a hardcopy form machine-readable code on a substrate which is then integrated in the original document so as to provide the hardcopy secure document.

18. The method of claim 15, further comprising:
providing an electronic version of the original document to an image processing apparatus so as to obtain the captured image;
selecting a segment of the electronic version according to the image signature template;
converting the selected image segment to a image signature;
encoding data representing the image signature and the image signature template in machine-readable code;
merging the machine-readable code with the captured image to provide a composite image; and
providing the composite image to reprographic apparatus for generation of a hardcopy version of the secure document in hardcopy form, so as to provide the hardcopy secure document.

19. The method of claim 15, wherein the machine-readable code is encoded according to at least one of the following encoding schemes: holographic coding, magnetic stripe coding, high-density barcode coding, microdot coding, data glyph coding; serpentine coding, and a combination thereof.

20. The method of claim 15, wherein the data encoding step further comprises encoding data for inclusion in the machine-readable code that is representative of at least one of: information concerning the level of corroboration of the encoded image signature for validation of the secure hardcopy version; information specific to a given hardcopy secure document; information specifying image processing, image encryption, image compression, and/or image discrimination algorithms which are to be performed for validation of the secure hardcopy version: and information specifying operations which are to be performed by a validation system depending on the presence or absence of a valid/invalid condition.

21. A method for validating a hardcopy secure document, comprising:
providing the hardcopy secure document to an image capture apparatus;
capturing an image of the hardcopy secure document;
digitizing the image of the hardcopy secure document so as to provide a digitized image;
locating encoded data representing an image signature and an image signature template presented in the digitized image;
decoding the encoded data so as to recover data representative of a primary image signature and the image signature template;
selecting an image segment of the digitized image according to a the image signature template so as to provide data representative of a secondary image signature;
comparing the data representative of the primary and secondary image signatures; and
determining, in response to the comparing of the data, a corresponding validation or invalidation condition.

* * * * *